United States Patent [19]
Owen et al.

[11] 3,708,317
[45] Jan. 2, 1973

[54] METALLURGICAL FURNACE LINING AND METHOD OF PRODUCTION

[75] Inventors: Arthur John Owen, Worksop, Great Britain; Reier Visser, Driehuis, Netherlands; Jacobus Van Laar, Santpoort, Netherlands

[73] Assignee: Koninklyke Nederlandsche Horgovens En Staalfabrieken N.V., Ijmuiden, Netherlands

[22] Filed: Dec. 7, 1970

[21] Appl. No.: 95,986

Related U.S. Application Data

[63] Continuation-in-part of Ser. No. 766,644, Oct. 9, 1968, abandoned.

[52] U.S. Cl. ..................106/56, 106/65, 106/67, 106/68, 106/69, 117/119, 117/123 A, 117/169 R, 264/30, 264/62, 264/66
[51] Int. Cl. ...............................................B44d 1/02
[58] Field of Search..........106/55, 67, 68, 69, 65, 56; 264/30, 62, 66, 118; 117/114, 123 A, 169 R

[56] References Cited

UNITED STATES PATENTS

| | | | |
|---|---|---|---|
| 2,805,174 | 9/1957 | Veale | 117/54 |
| 3,357,842 | 12/1967 | Bowman | 264/30 X |

OTHER PUBLICATIONS

The Condensed Chemical Dictionary, 7th Edition, Reinhold Publishing Corp., New York, Copyright 1950, 1956, 1961

Primary Examiner—Edward G. Whitby
Attorney—Stevens, Davis, Miller & Mosher

[57] ABSTRACT

This invention relates to bricks and other refractory bodies for lining metallurgical equipment such as blast furnaces which are made resistant to alkali attack by impregnation with phosphorus compounds.

13 Claims, No Drawings

METALLURGICAL FURNACE LINING AND METHOD OF PRODUCTION

This application is a continuation-in-part of application Ser. No. 766,644 filed by us on Oct. 9, 1968, now abandoned.

The invention relates to a metallurgical furnace, more specifically a blast furnace, for the preparation of a molten metal in the presence of alkali metal compounds.

The invention further relates to a refractory body such as bricks, and a method of making them for use as lining material in blast furnaces and like metallurgical equipment where alkali-attack can take place.

The object of the invention is to provide metallurgical furnaces, in particular blast furnaces, the refractory lining of which has a greater resistance to the distinctive action of alkali metal compounds regardless of whether or not this lining consists of oxides of aluminum and silicon or aluminum silicates, or carbon.

Another object of the invention is to provide refractory bodies for lining metallurgical furnaces, in particular blast furnaces, being resistant to alkali attack.

The destructive influence of alkali metal compounds, particularly potassium compounds, on the refractory material being used as lining in blast furnaces and like metallurgical equipment, is well-known to refractory technologists. This phenomenon, being generally referred to as alkali attack, occurs not only with refractory lining consisting of alumino, silica and/or alumino silicate, but also with refractory lining consisting of carbon. It is immaterial whether this lining is present in the furnace in the form of bricks or other refractory bodies or in the form of an uninterrupted, continuous, monolithic lining.

Alkali metal compounds are introduced into the furnace as minor constituents of the raw materials charged to the furnace. In case of an iron-making blast furnace said compounds are introduced by the iron ore, the coke and particularly by the slag-forming additives. In marine districts alkali metal compounds may even be introduced by the hot blast air.

Under the reducing conditions under which the furnace operates, these alkali metal compounds volatilize and partly accumulate in the lining, particularly in the lower regions of the shaft (where alkali contents up to about 30 percent may be found) and also in the bosh and the hearth. Because of the reaction which takes place between said alkalies and the refractory material of the lining, considerable disruption of said material is caused, and consequently, the useful life thereof is materially shortened.

This disruption occurs irrespective of whether or not the various refractory lining materials, being used for different parts of the lining, originally had excellent physical properties with respect to erosion, corrosion and abrasion resistance, or good resistance to mechanical stressing, slag attack and thermal shock.

The alkali attack also occurs in the linings of other furnaces in which there is a reducing atmosphere, e.g., furnaces for the reduction of ores such as those of copper and zinc.

The reaction with the refractory material takes place with the alkalies in both the gaseous and the liquid phase, but said reaction proceeds much quicker in the liquid phase. Therefore, the alkali attack becomes much worse when the volatilized alkalies condensate on or inside the refractory lining material.

Until now the refractory technologist was confronted with the problem that the alkali attack occurs not only on the external surface of the refractory material, but also on the internal surface thereof since the alkali penetrates internally into the refractory material, especially when said material is porous. This internal attack causes a destructive action both on the refractory material and on the bonding which holds the refractory grains together. Because of this internal attack, there is a rapid loss of refractory material.

When alumino silicates or high-alumino is used as the refractory material, the alkalies react with said material to form compounds such as potash feldspar ($K_2O \cdot Al_2O_3 \cdot 6SiO_2$), leucite ($K_2O \cdot Al_2O_3 \cdot 4SiO_2$), kaliophilite ($K_2O \cdot Al_2O_3 \cdot 2SiO_2$) and B-alumina ($K_2O \cdot 12 Al_2O_3$). Other compounds may be formed, such as compounds in which the $K_2O$ is partially replaced by $Na_2O$.

The specific volume of the reaction products formed by the alkali attack on the refractory lining material is generally greater than the volume of the reacting substances themselves. Consequently the alkali attack leads to disruptive stresses within the refractory material causing at least a serious cracking of the material. It is common to find that the coherence of the refractory lining material in a blast furnace that has been in operation for some time is completely destroyed by this increase in volume.

The disruptive action of the reaction which takes place during the alkali attack proceeds irrespective of the favorable properties of the refractory lining, being used in furnaces for the first time, so that improvements made in the strength of the refractory material do not solve the problem of alkali attack.

Another object of this invention is to provide a method of making refractory bodies such as bricks for lining blast furnaces and like metallurgical equipment which bodies are highly resistant to alkali attack.

Another object is to provide a refractory body having improved resistance to alkali attack.

Other objects and advantages of the invention will become apparent as to the following detailed description progresses.

According to one aspect of the present invention, the lining of a blast furnace or other furnace operating under reducing conditions consists at least partly of refractory material, the surface layer of the inside pore surface of which consists partly of a phosphorus compound, but in which the ceramic bond is substantially free from this compound.

In accordance with another aspect of this invention a refractory body, such as bricks for lining metallurgical equipment such as blast furnaces having a porosity of at least 10 percent and the grains of said body being held together by ceramic bondings, is subjected to an impregnation treatment with an aqueous solution of a phosphorus compound and the impregnated material is then heated at a temperature above 100° C, preferably between 400° C and 500° C for at least 1 hour, preferably 5 to 6 hours.

In this respect it should be remarked that the invention is purposely restricted to refractory bodies having a porosity of at least 10 percent. It was found that refractory bricks having a porosity of less than 10 percent are insufficiently elastic under the conditions in blast furnaces and like metallurgical equipment, and will soon crush when exposed to varying temperatures. The ultimate deterioration of such bricks will therefore not be due to alkali attack in the first place. Also, the smaller the porosity is, the smaller becomes the internal pore surface, and hence the available surface on which alkali attack can take place.

The invention is based upon the discovery that a refractory brick or another refractory body having a porosity of at least 10 percent which is substantially completely ceramically bonded is impregnated with an aqueous solution of a phosphorus compound and thereafter heated at a temperature above 100° C for at least 1 hour, results in a product in which the impregnated phosphorus compound is only present in the top layer of the inside pore surface whereas the ceramic bonding of said refractory product is substantially free from said phosphorus compounds. Such a product is highly resistant to alkali attack.

The ceramical bond is obtained by firing at such a high temperature (as a rule above 900° C), that from the refractory grains sufficient glassy liquid is formed to bind the more refractory parts of the grains, mainly mullite, together.

Many refractory clays satisfy the general formula $(K_2O)_x(Al_2O_3)_y(SiO_2)_z \cdot H_2O_n$. By firing such a clay a transformation takes place into:

$3Al_2O_3 \cdot 2SiO_2$ (mullite)

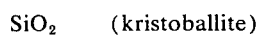

$SiO_2$ (kristoballite)

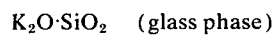

$K_2O \cdot SiO_2$ (glass phase)

The mullite and kristoballite grains are molten together with the glass phase.

Although the amount of the phosphorus compounds employed is immaterial, preferably the amount of phosphorus compound which is impregnated is such that the content of the phosphorus compound, calculated as $P_2O_5$, is 2 percent to 8 percent by weight of the refractory material. The amount of the phosphorus compound which is impregnated depends on the porosity and the pore-size of the refractory material.

The higher the porosity and the bigger the pores of the refractory material the higher also the amount of phosphorus compound which is impregnated.

Suitable phosphorus compounds for use in the present invention are ortho-phosphoric acid ($H_3PO_4$) and ammonium phosphate (($NH_4)_3PO_4$). Aluminum phosphates such as mono-aluminum phosphate ($Al(H_2PO_4)_3$) (aluminum dihydrogen orthophosphate) and aluminum meta-phosphate ($Al(PO_3)_3$) are preferred.

The refractory material to be used for the impregnation treatment according to the invention may be selected both from the group of the oxides of aluminum and silicon and the alumino silicates and from the group of refractory material mainly composed of carbon.

The invention is also related to the refractory bricks or other refractory bodies for lining blast furnaces and like metallurgical equipment being resistant to alkali attack comprising a porous refractory body, the refractory grains of which are ceramically bonded together, in which the surface of the internal pores contain a phosphorus compound, the ceramic bond, however, being substantially free from said phosphorus compound.

The impregnation of refractory material with phosphorus compounds according to the invention in order to make this material resistant to alkali attack should not be mistaken for the known treatment of refractories with phosphoric acid and/or phosphate with subsequent heating in order to react said phosphorus compound with the refractory. Such a product may have an improved strength due to the improved coherence of the refractory grains through chemical bonds; however, these chemical bonds are different from ceramic bonds obtained by binding the grains of the refractory material together by means of a glassy phase. More particularly such chemical bonds contain phosphorus compounds, which cause the strength of the refractory bricks quickly to fall down at elevated temperatures. This can be elucidated by measuring the strength of a chemically bonded refractory brick at various temperatures. One such a brick is traded by the code-name PH 850 and is bonded with a monophosphate compound. At 20° C these bricks show a bending strength of 1,400 psi, which increased up to 2,550 psi when the brick is heated to 400° C, because of a transformation of the monophosphate into a polyphosphate compound. On further elevating the temperature the polyphosphate is broken down, which results in a strength of 990 p.s.i. at 1,200° C, and 630 p.s.i. at 1,400° C. On cooling the brick its strength is not restored.

Contrasted with this known treatment in which the strength of the refractory before and after treatment is essentially increased and the bonding of the material is substantially of the chemical type, there is no significant increase in strength after the treatment according to the present invention. According to the invention, the treatment is carried out on ceramically bonded refractory bodies, the strength of which is almost maximum before impregnation. Due to the fact that the strength of the ceramical bonds is not essentially affected by the impregnation with phosphoric acid, phosphorus compounds or decomposition product thereof, said refractory bodies remain essentially unimpaired in this respect. It is also found that upon firing such a brick up to 1,400° C and subsequently cooling it again, the strength remains essentially unimpaired, as contrasted with the chemically bonded bricks.

Although the reason for the surprising effect obtained by the present invention is not entirely known, it is assumed that the improved protective action of refractory materials treated according to the present invention against alkali attack is due to the fact that the phosphorus compounds are bonded to the inside pore surface and form on said surface a heat and alkali resistant polymeric framework.

The impregnation of the refractory body can be carried out in different ways but it is preferable to impregnate the ceramically bonded material at room temperature under partial vacuum for at least about 30 minutes.

Another suitable method for impregnating the ceramically bonded body comprises impregnating the material under atmospheric pressure for more than about 30 minutes after heating the body at about a temperature of 150° to 250° C.

To investigate the proneness to alkali attack the following test can be used:

In a section of brick measuring approximately 4 ½ × 4 ½ × 3 inches, a hole of 50 mm diameter is drilled to 45 mm depth. Into this hole is compressed 100 grams of anhydrous potassium carbonate. The brick specimen or "crucible" containing the potassium carbonate is then subjected to heat treatment by placing it in a stainless steel or ceramic box, the specimen being surrounded on all sides by crushed metallurgical coke. The box is then heated to 950° C. in 4 hours and maintained at that temperature for 5 hours, e.g., in an electrically heated furnace or in a furnace fired with gas and air.

After the heat treatment, the box is allowed to cool and the contents are then removed, the coke being removed by a vacuum cleaner or similar apparatus.

Examination of the specimen reveals that the potassium carbonate has melted and been partially dissociated. Generally the majority of the material has been absorbed into the brick structure. The absorbed material reacts with the constituents of the brick and forms the type of compounds of which examples have been give above. This may lead to complete disintegration of the brick, or varying degrees of cracking. Depending upon the extent to which the specimen has been disrupted, the bricks are given an index, to indicate their resistance to alkali attack:

| Index | Resistance to alkali attack | State of specimen |
|---|---|---|
| 1 | extremely poor | complete disintegration |
| 2 | very poor | partial disintegration |
| 3 | poor | heavy cracking |
| 4 | moderate | light cracking |
| 5 | good | unaffected |

Reference to this "crucible" test is made below, in demonstrating the effectiveness of the invention, but many modifications of the test are possible without affecting its validity. In applying the test, the heat treatment can be repeated on specimens with the addition of further potassium carbonate between each treatment. In this way it is possible to produce progressive deterioration of specimens, and, for example, a refractory quality having an index of 4 after the first test could have an index of only 2 after the third test. This makes it possible to relate the results of the test closely to the likely performance of the refractory material in service.

Thus, starting with an unimpregnated brick giving an index of 1 after only one test, there can be produced a brick giving on index of 5 after repeated tests, by giving it the impregnation treatment described above.

The following examples, which are not to be regarded as limitative as regards the application of the invention, demonstrate the advantages achieved by the invention:

EXAMPLE I

An alumino-silicate refractory brick of quality commonly used as lining material for iron-making blast furnaces having an apparent porosity of 11.1 percent, a cold crushing strength of 840 kg/cm² and being produced by firing alumino-silicate refractory material having the desired shape at a temperature above the vitrification temperature of this material so as to vitrify the refractory grains together forming ceramic bonds in the brick, was found to be subject to alkali attack. The brick had the following chemical analysis:

| | |
|---|---|
| $SiO_2$ | 51.80% by weight |
| $Al_2O_3$ | 44.21% by weight |
| $TiO_2$ | 1.27% by weight |
| $Fe_2O_3$ | 0.93% by weight |
| $CaO$ | 0.34% by weight |
| $MgO$ | 0.21% by weight |
| $K_2O$ | 0.23% by weight |
| $Na_2O$ | 0.61% by weight |
| Other elements | 0.40% by weight |

One-half of the brick was subjected to an impregnation treatment as described below in order to introduce a phosphorus containing compound into the pores of the brick, the other half of the brick was left untreated.

The impregnation treatment on one-half of the brick was carried out as follows.

The brick-half was placed in a vessel and the vessel was sealed. A vacuum pump was then attached to the vessel and the pressure reduced to 2 inches water gauge. An aqueous solution of orthophosphoric acid having a concentration of about 50 percent was then introduced into the vessel until the brick-half was completely covered. This situation was maintained for 30 minutes. Then atmospheric pressure was reintroduced into the vessel above the ortho-phosphoric acid solution. The ortho-phosphoric acid solution was removed from the vessel and the brick was found to have their pores completely filled up with phosphoric acid solution. The impregnated brick was transferred to an electrically heated furnace and the temperature was raised to 450° C, this being maintained for 5 hours. The furnace was then allowed to cool and the brick was removed. In the following table, the cold crushing strength and resistance to alkali attack (expressed in the index figures according to the above mentioned "crucible test") are given for an unimpregnated brick and for a brick after the above mentioned impregnation treatment.

| | Cold crushing strength | "crucible test index figure" |
|---|---|---|
| unimpregnated | 860 | 4–5 |
| impregnated | 860 | 1 |

The index figures before and after the impregnation treatment show that the untreated brick is prone to complete disintegration or at least to light cracking and that such a brick is made wholly resistant to alkali attack or prone to no more than light cracking when it is treated in the above mentioned way. The treated brick is thus eminently suitable for parts of the lining of an iron-making blast furnace, by virtue of their greatly improved resistance to attack by alkali metal compounds.

After the above mentioned impregnation treatment, the brick was found to have an apparent porosity of 6.82 percent and a $P_2O_5$ content of 2.5 percent.

Specimens of the above mentioned treated brick were boiled in water but it was found that the impregnated phosphorus compound was completely insoluble.

EXAMPLE 2

A ceramically bonded carbon refractory brick of quality commonly used as a lining material in the hearth of iron-making blast furnace having an apparent porosity of 14 percent and a cold crushing strength of 300 kg/cm² was found to be subject to alkali attack. The brick had the following chemical analysis:

| | |
|---|---|
| carbon | 95.9% by weight |
| $CO_2$ | 1.1% by weight |
| S | 0.13% by weight |
| Pb | 0.3% by weight |
| Ash | 3.2% by weight (containing mainly $K_2O$, $Na_2O$ and $SiO_2$). |

One-half of the brick was subjected to an impregnation treatment and to a subsequent heating in the same manner as described in Example I, the other half of the carbon brick was left untreated.

From the following table, the surprising improvement in the resistance to alkali attack can be seen.

| | Cold crushing strength kg/cm² | "Crucible test index figure" |
|---|---|---|
| unimpregnated | 300 | 3–4 |
| impregnated | 300 | 5 |

The phosphorus in the treated brick proved to be insoluble in boiling water.

After the impregnation treatment as mentioned above, the brick was found to have a $P_2O_5$ content of 3 percent.

EXAMPLE 3

A ceramically bonded high alumino brick of quality suitable for lining parts of an iron making blast furnace having an apparent porosity of 21.8 percent, a cold crushing strength of 400 kg/cm² and being produced by firing high alumina refractory material having the desired shape above the vitrification temperature of this material in order to bond the refractory grains together by ceramic bonds, was found to be subject to alkali attack. The brick had the following chemical analysis.

| | |
|---|---|
| $SiO_2$ | 0.15% by weight |
| $Al_2O_3$ | 97.78% by weight |
| $Fe_2O_3$ | 0.03% by weight |
| $TiO_2$ | 0.04% by weight |
| CaO | 0.11% by weight |
| MgO | 0.10% by weight |
| $K_2O$ | 0.02% by weight |
| $Na_2O$ | 0.17% by weight |
| Other elements | 1.6% by weight |

One-half of the brick was subjected to an impregnation treatment as described below, the other half of the brick was left untreated.

The impregnation treatment on one-half of the brick was carried out as follows.

The brick-half was immersed in a saturated aqueous solution of aluminum di-hydrogen ortho-phosphate for a period of 4 hours at a temperature of about 200° C. After this, the pores of the brick were found to be completely filled with the solution and the excess solvent was removed by draining, whereafter the brick was dried and heated to a temperature of 420° C for a period of 6 hours and subsequently allowed to cool.

After this treatment it was found that the brick contained 4.12% $P_2O_5$, which was insoluble in boiling water.

From the following table, the surprising improvement in the resistance to alkali attack can be seen.

| | Cold crushing strength kg/cm² | "Crucible test index figure" |
|---|---|---|
| unimpregnated | 400 | 1 |
| impregnated | 400 | 4 |

The above mentioned test was repeated except that a saturated aqueous solution of aluminum metaphosphate was used instead of the aqueous solution of aluminum di-hydrogen ortho-phosphate. After drying and cooling the brick was found to contain a content of about 4% $P_2O_5$, which was insoluble in boiling water. Also the "crucible test" rendered the same results.

Again the above mentioned test was repeated, but this time the samples were impregnated with a saturated aqueous solution of ammonium phosphate.

After drying and cooling the brick contained 8% $P_2O_5$ and the "crucible test" rendered an index figure of 5.

What is claimed is:

1. A method for making refractories adapted for lining blast furnaces and the like having an improved resistance to attack by alkali which comprises impregnating the pores of a refractory body having a porosity of at least 10 percent and refractory grains which are substantially completely ceramically bonded together by vitrification with an aqueous solution of a phosphorous compound and heating the impregnated body at a temperature above 100° C for at least 1 hour thereby depositing the phosphorous compound on the surface of the pores while the ceramic bonds remain substantially free from the phosphorous compound.

2. A method according to claim 1 in which the impregnated body is heated at a temperature between 400° C and 500° C for from 5 to 6 hours.

3. A method according to claim 1 in which the refractory body is impregnated with said solution under partial vacuum and at room temperature for more than about 30 minutes.

4. A method according to claim 1 in which the refractory body is impregnated with said solution at atmospheric pressure and at a temperature between 150° C and 250° C for more than about 30 minutes.

5. A method according to claim 1 in which the phosphorus compound is selected from the group consisting of orthophosphoric acid, mono-aluminum phosphate, aluminum metaphosphate and ammonium phosphate.

6. A method according to claim 1 in which the phosphorus compound is impregnated into said refractory body in an amount such that the content of the phosphorus compound, calculated as $P_2O_5$, is 2 to 8 percent by weight of said body.

7. A method according to claim 1 in which the refractory body is selected from the group consisting of aluminum oxide, silicon oxide and alumino silicates.

8. A method according to claim 1 in which the refractory body consists essentially of carbon.

9. A refractory for lining blast furnaces and the like having a porous refractory body of ceramically welded refractory grains, the porosity of the body being at least 10 percent, said body containing a phosphorous compound on the surface of its pores but being substantially free from phosphorus compound in the ceramic bonds whereby said body has improved resistance to attack by alkali.

10. Refractory body according to claim 9 in which the content of the phosphorus compound, calculated as $P_2O_5$, is 2 to 8 percent by weight of said body.

11. Refractory body according to claim 9 in which the phosphorus compound is incorporated as an aluminum phosphate in said body.

12. Refractory body according to claim 9 in which the refractory material of said body is selected from the group consisting of aliminum oxide, silicon oxide and alumina silicates.

13. Refractory body according to claim 9 in which the refractory material of said body consists essentially of carbon.

\* \* \* \* \*